US007486717B2

(12) United States Patent
De Wilde et al.

(10) Patent No.: US 7,486,717 B2
(45) Date of Patent: Feb. 3, 2009

(54) METHOD AND DEVICE FOR DEMODULATING GALILEO ALTERNATE BINARY OFFSET CARRIER (ALT-BOC) SIGNALS

(75) Inventors: Wim De Wilde, Kessel-Lo (BE); Jean-Marie Sleewaegen, Jette (BE); Gonzalo Seco Granados, Barcelona (ES)

(73) Assignee: European Space Agency, Paris (FR)

( * ) Notice: Subject to any disclaimer, the term of this patent is extended or adjusted under 35 U.S.C. 154(b) by 153 days.

(21) Appl. No.: 11/680,851

(22) Filed: Mar. 1, 2007

(65) Prior Publication Data
US 2007/0201537 A1 Aug. 30, 2007

Related U.S. Application Data

(63) Continuation of application No. PCT/EP2004/009952, filed on Sep. 7, 2004.

(51) Int. Cl.
  H04B 1/707 (2006.01)
  H03D 3/00 (2006.01)
  H04L 27/06 (2006.01)
(52) U.S. Cl. ................... 375/150; 375/322; 375/343
(58) Field of Classification Search ................. 375/142, 375/144, 148, 150, 260, 261, 271, 316, 322, 375/327, 343, 367
See application file for complete search history.

(56) References Cited

U.S. PATENT DOCUMENTS 6,922,167 B2 * 7/2005 Gerein ................. 342/357.12

OTHER PUBLICATIONS

Dovis, F. et al.; SDR Technology Applied to Galileo Receivers; Proceedings of the Institute of Navigation (ION) GPS (2002), Portland, Oregon; Sep. 24, 2002; 2566-2575.
Soellner, M. et al.; Comparison of AWGN Code Tracking Accuracy for Alternative-BOC, Complex-LOC and Complex-BOC modulation options in Galileo E5-band; GNSS 2003, the European Navigation Conference (2003), Graz, Austria; Apr. 22, 2003.
Hegarty, C.J. et al.; Evaluation of Proposed Signal Structure for the New Civil GPS Signal at 1176.45 MHz; MITRE Technical Report; Jun. 1999; 1-27.
Hein, G.W. et al.; Status of Galileo Frequency and Signal Design; Proceedings of the Institute of Navigation (ION) GPS (2002), Portland, Oregon; Sep. 24, 2002; 266-277.
Ries, L. et al.; A Software Simulation Tool for GNSS2 BOC Signals Analysis; Proceedings of the Institute of Navigation (ION) GPS (2002), Portland, Oregon; Sep. 24, 2002; 2225-2239.

* cited by examiner

*Primary Examiner*—Don N Vo
(74) *Attorney, Agent, or Firm*—Panitch Schwarze Belisario & Nadel LLP

(57) ABSTRACT

A method for demodulating alternate binary offset carrier signals includes at least two subcarriers, each having an in-phase and a quadrature component modulated by pseudo-random codes. The quadrature components are modulated by dataless pilot signals. The in-phase components are modulated by data signals. The method includes converting the alternate binary offset carrier signals into an intermediate frequency, band-pass filtering the converted signals and sampling the filtered signals, generating a carrier phase and carrier phase-rotating the sampled signals by the carrier phase, correlating the rotated sampled signals, and generating, for each subcarrier, pseudo-random binary codes and a subcarrier phase, which are used to correlate the rotated sampled signals.

11 Claims, 7 Drawing Sheets

METHOD AND DEVICE FOR DEMODULATING GALILEO ALTERNATE BINARY OFFSET CARRIER (ALT-BOC) SIGNALS

CROSS-REFERENCE TO RELATED APPLICATIONS

This application is a Continuation of International Application No. PCT/EP2004/009952, filed Sep. 7, 2004, which was published in the English language on Mar. 16, 2006, under International Publication No. WO 2006/027004 A1 and the disclosure of which is incorporated herein by reference.

BACKGROUND OF THE INVENTION

The present invention relates generally to Global Navigation Satellite System (GNSS) receivers and, in particular, to receivers that operate with Galileo alternate binary offset carrier (AltBOC) satellite signals.

Global navigation satellite system (GNSS) receivers, such as Galileo receivers, determine their global position based on signals received from orbiting GNSS satellites. The GNSS satellites transmit signals using at least one carrier, each carrier being modulated by at least a binary pseudorandom (PRN) code, which consists of a seemingly random sequence of ones and zeros that is periodically repeated. The ones and zeros in the PRN code are referred to as "code chips" and the transitions in the code from one to zero or zero to one, which occur at "code chip times" are referred to as "code chip transitions". Each GNSS satellite uses a unique PRN code, and thus, a GNSS receiver can associate a received signal with a particular satellite by determining which PRN code is included in the signal.

The GNSS receiver calculates the difference between the time a satellite transmits its signal and the time that the receiver receives the signal. The receiver then calculates its distance, or "pseudo-range" from the satellite based on the associated time difference. Using the pseudo-ranges from at least four satellites, the receiver determines its global position.

To determine the time difference, the GNSS receiver synchronizes a locally generated PRN code with the PRN code in the received signal by aligning the code chips in each of the codes. The GNSS receiver then determines how much the locally-generated PRN code is shifted in time from the known timing of the satellite PRN code at the time of transmission, and calculates the associated pseudo-range. The more closely the GNSS receiver aligns the locally-generated PRN code with the PRN code in the received signal, the more precisely the GNSS receiver can determine the associated time difference and pseudo-range and, in turn, its global position.

The code synchronization operations include acquisition of the satellite PRN code and tracking the code. To acquire the PRN code, the GNSS receiver generally makes a series of correlation measurements that are separated in time by a code chip. After acquisition, the GNSS receiver tracks the received code. The GNSS receiver generally makes "Early-Minus-Late" correlation measurements, i.e., measurements of the difference between (i) a correlation measurement associated with the PRN code in the received signal and an early version of the locally-generated PRN code, and (ii) a correlation measurement associated with the PRN code in the received signal and a late version of the local PRN code. The GNSS receiver then uses the early-minus-late measurements in a delay lock loop (DLL), which produces an error signal that is proportional to the misalignment between the local and the received PRN codes. The error signal is used, in turn, to control the PRN code generator, which shifts the local PRN code essentially to minimize the DLL error signal.

The GNSS receiver also typically aligns the satellite carrier with a local carrier using correlation measurements associated with a punctual version of the local PRN code. To do this the receiver uses a carrier tracking phase lock loop (PLL).

The European Commission and the European Space Agency (ESA) are developing a GNSS known as Galileo. Galileo satellites will transmit two signals in the E5a band (about 1176.45 MHz) and two signals in the E5b band (about 1207.14 MHz) as a composite signal with a center frequency of about 1191.795 MHz and a bandwidth of at least 70 MHz, using a AltBOC modulation. The generation of the AltBOC signal is described in the document of the Galileo Signal Task Force of the European Commission "Status of Galileo Frequency and Signal Design", G. W. Hein, J. Godet, J. L. Issler, J. C. Martin, P. Erhard, R. Lucas-Rodriguez and T. Pratt, 25 Sep. 2002, published at the following address: http://europa.eu.int/comm/dgs/energy_transport/galileo/documents/technical_en.htm. Like the GPS satellites, the Galileo satellites each transmit unique PRN codes and a Galileo receiver can thus associate a received signal with a particular satellite. Accordingly, the Galileo receiver determines respective pseudo-ranges based on the difference between the times the satellites transmit the signals and then times the receiver receives the AltBOC signals.

A standard linear offset carrier (LOC) modulates a time domain signal by a sine wave $\sin(\omega_0 t)$, which shifts the frequency of the signal to both an upper sideband and a corresponding lower sideband. The BOC modulation accomplishes the frequency shift using a square wave, or $\mathrm{sign}(\sin(\omega_0 t))$, and is generally denoted as $\mathrm{BOC}(f_s, f_c)$, where $f_s$ is the subcarrier (square wave) frequency and $f_c$ is the spreading code chipping rate. The factors of 1.023 MHz are usually omitted from the notation for clarity so a BOC (15.345 MHz, 10.23 MHz) modulation is denoted BOC (15,10).

The modulation of a time domain signal by a complex exponential $e^{j\omega_0 t}$ shifts the frequency of the signal to the upper sideband only. The goal of the AltBOC modulation is to generate in a coherent manner the E5a and E5b bands, which are respectively modulated by complex exponentials, or subcarriers, such that the signals can be received as a wideband "BOC-like signal". The E5a and E5b bands each have associated in-phase (I) and quadrature (Q) spreading, or PRN, codes, with the E5a codes shifted to the lower sideband and the E5b codes shifted to the upper sideband. The respective E5a and E5b quadrature carriers are modulated by dataless pilot signals, and the respective in-phase carriers are modulated by both PRN codes and data signals.

The AltBOC modulation offers the advantage that the E5a (I and Q) and E5b (I and Q) signals can be processed independently as traditional BPSK(10) (Binary Phase-Shift Keying) signals, or together, leading to tremendous performances in terms of tracking noise and multipath.

For the derivation of the demodulation principle of the AltBOC modulation, it is sufficient to approximate the baseband AltBOC signal by its AltLOC (Alternate Linear Offset Carrier) counterpart:

$$s(t) = d_1(t) \cdot c_1(t) \cdot e^{j\omega_s t} + d_2(t) \cdot c_2(t) \cdot e^{-j\omega_s t} + c_3(t) \cdot e^{j(\omega_s t + \pi/2)} + c_4(t) \cdot e^{-j(\omega_s t - \pi/2)} \quad (1)$$

where:

$c_1(t)$ is the PRN code of the E5b-data component (E5bI) and $d_1(t)$ is the corresponding bit modulation;

$c_2(t)$ is the PRN code of the E5a-data component (E5aI) and $d_2(t)$ is the corresponding bit modulation;

$c_3(t)$ is the PRN code of the E5b-pilot component (E5bQ);
$c_4(t)$ is the PRN code of the E5a-pilot component (E5aQ);
the exponential factors represent the subcarrier modulation of E5a and E5b;
$\omega_s$ is the side-band offset pulsation: $\omega_s=2\pi f_s$, with $f_s=15.345$ MHz.

In reality, s(t) contains additional product terms and the subcarrier exponentials are quantized. This effect will not be explicitly included in the equations for the sake of clarity. s(t) is modulated on the E5 carrier at 1191.795 MHz.

Most previous publications present AltBOC from a satellite payload perspective, i.e., from a transmitter viewpoint. The receiver side processing has received very little attention so far.

The publication "Comparison of AWGN Code Tracking Accuracy for Alternative-BOC, Complex-LOC and Complex-BOC Modulation Options in Galileo E5-Band, M. Soellner and Ph. Erhard, GNSS 2003, April 2003, discloses the principle of a AltBOC receiver architecture for tracking the AltBOC pilot component, as shown in FIG. 1.

In FIG. 1, the AltBOC receiver receives over an antenna 1 a signal that includes AltBOC composite codes transmitted by all of the satellites that are in view. The received signal is applied to a RF/IF stage 2 that, in a conventional manner, converts the received signal RF to an intermediate frequency IF signal that has a frequency which is compatible with the other components of the receiver, filters the IF signal through a IF band-pass filter that has a band-pass at the desired center carrier frequency, and samples the filtered IF signal at a rate that satisfies the Nyquist theorem so as to produce corresponding digital in-phase (I) and quadrature (Q) signal samples in a known manner. The bandwidth of the filter should be sufficiently wide to allow the primary harmonic of the AltBOC composite pilot code to pass, or approximately 51 MHz. The wide bandwidth results in relatively sharp code chip transitions in the received code, and thus, fairly well defined correlation peaks.

The AltBOC receiver comprises a local carrier oscillator 4, for example of the NCO type (Numerically Controlled Oscillator), synchronized with the IF frequency to generate a phase rotation angle on M bits which is applied to a phase rotator 3 receiving the IF signal samples on N bits. The phase rotated signal samples on N bits delivered by the phase rotator are applied to three complex correlators, each comprising a signal multiplier 10, 11, 12 and an integrator 13, 14, 15. The integrators sum the signal samples received during a predefined integration time $T_{int}$.

The AltBOC receiver further comprises another local oscillator 5 of the NCO type synchronized with the code chipping rate $f_c$, and which drives a complex AltBOC code generator 6 for locally generating complex PRN pilot codes for a given satellite. The generated pilot codes pass through a multi-bit delay line 7 comprising three cells E, P, L producing respectively early, prompt and late replicas of the local PRN codes which are applied respectively to an input of the multipliers 10, 11, 12.

The signals $C_E$, $C_P$ and $C_L$ delivered by the integrators 13, 14, 15 are then used to generate a carrier phase and code error signals which are used to drive the NCO oscillators 4, 5.

The AltBOC code generator 6 presents the drawback of being complex and multi-bit. Namely, it produces a quantized version of the Alt-LOC base-band signal (assuming only the pilot component is tracked) in the following form:

$$c_3(t) \cdot e^{-j(\omega_s t + \pi/2)} + c_4(t) \cdot e^{j(\omega_s t - \pi/2)} \quad (2)$$

Such a complex base-band signal is cumbersome to generate. The architecture shown in FIG. 1 also implies that all the operators (delay line, multipliers and integrators) operate on complex multi-bit numbers.

BRIEF SUMMARY OF THE INVENTION

Embodiments of the present invention are directed to a simplified method and device for demodulating Galileo signals.

An embodiment of the present invention comprises a method for demodulating alternate binary offset carrier signals comprising at least two subcarriers each having an in-phase and a quadrature component modulated by pseudo-random codes. The quadrature components are modulated by dataless pilot signals. The in-phase components are modulated by data signals. The method includes converting the alternate binary offset carrier signals into an intermediate frequency, band-pass filtering the converted signals and sampling the filtered signals, generating a carrier phase and carrier phase-rotating the sampled signals by the carrier phase, and correlating the rotated sampled signals.

According to embodiments of the invention, this method further includes generating, for each subcarrier, pseudo-random binary codes and a subcarrier phase, which are used to correlate the rotated sampled signals.

According to another preferred embodiment of the invention, the method further includes translating said pseudo-random codes of said subcarriers into phase angles which are combined respectively with the subcarrier phases so as to obtain resultant phase angles for each subcarrier. The resultant phase angles being phase-shifted so as to obtain at least one early, a prompt and at least one late phase angles for each subcarrier. The correlation includes phase-rotating the rotated sampled signals by said early, prompt and late phase angles of each subcarrier, for obtaining early, prompt and late replicas of the sampled signals for each subcarrier, and integrating respectively the early, prompt and late replicas for each subcarrier during a predefined time.

According to another preferred embodiment of the invention, the method further includes phase-rotating the rotated sampled signals by the subcarriers phases so as to obtain phase-rotated sampled signals for each subcarrier, before correlating the rotated sampled signals.

According to another preferred embodiment of the invention, the method further includes bit-shifting the pseudo-random codes so as to obtain at least one early, a prompt and at least one late pseudo-random codes. The correlation includes combining the phase-rotated sampled signals for each subcarrier with the early, prompt and late pseudo-random codes, and integrating the resulting signals during a predefined time, so as to obtain early, prompt and late correlation signals for each subcarrier. The method further includes a low speed post-correlation phase which includes phase-rotating the early and late correlation signals of each subcarrier respectively by opposite constant phase angles, and adding respectively the thus obtained early correlation signals of the subcarriers, the prompt correlation signals of the subcarriers and the thus obtained late correlation signals of the subcarriers so as to obtain respectively resultant early, prompt and late correlation signals.

According to another preferred embodiment of the invention, the method further includes determining a combined carrier and subcarrier frequency for each subcarrier. Phase-rotating by the carrier phase and the subcarriers phases are combined into a single phase rotation step for each subcarrier using the combined carrier and subcarrier frequencies.

According to another preferred embodiment of the invention, the correlation includes combining the phase-rotated sampled signals for each subcarrier respectively with the pseudo-random codes of the subcarrier, and integrating during a predefined time the resulting signals for obtaining a correlation signal for each subcarrier.

According to another preferred embodiment of the invention, the method further includes a low speed post-correlation phase which includes combining the correlation signals for the subcarriers so as to obtain a prompt correlation signal used as an input of a PLL discrimination driving an oscillator controlling the carrier rotation step and a early-minus-late correlation signal used as an input of a DLL discrimination driving an oscillator controlling the code generation and the subcarrier phase generation.

According to another preferred embodiment of the invention, the early-minus-late correlation signal is obtained from the correlation signals for the subcarriers E5a, E5b by the following formula:

$$C_{E5,EmL} = j(C_{E5a,0} - C_{E5b,0}).$$

According to another preferred embodiment of the invention, the DLL discrimination is of the type Dot-product power discrimination and performs the following operation:

$$D = \text{Real}[C_{E5,EmL} \cdot C^*_{E5,0}],$$

where Real( ) is a function returning the real part of a complex number, the signal D being used to drive the oscillator controlling the code generation and the subcarrier phase generation.

According to another preferred embodiment of the invention, the DLL discrimination performs the following operation:

$$C_{E5,EmL} = j(C_{E5a,0} - C_{E5b,0})$$

where Imag( ) is a function returning the imaginary part of a complex number.

Embodiments of the present invention also concern a device for demodulating alternate binary offset carrier signals comprising at least two subcarriers each having an in-phase and a quadrature component modulated by pseudo-random codes, the quadrature components being modulated by data-less pilot signals, the in-phase components being modulated by data signals. According to the invention, this device comprises means for implementing the above-defined method.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Embodiments of the invention will now be detailed. According to the AltBOC demodulation principle, the pilot channel is formed by the combination of E5aQ and E5bQ signals. The AltBOC pilot signal is composed of the c3 and c4 components:

$$s_P(t) = c_3(t) \cdot e^{j(\omega_s t + \pi/2)} + c_4(t) \cdot e^{-j(\omega_s t - \pi/2)} \quad (3)$$

where $\omega_s$ is the side-band offset pulsation: $\omega_s = 2\pi f_s$, with $f_s = 15.345$ MHz.

In principle each component could be demodulated by correlating $s_P(t)$ with the code chip sequence, $c_i$-sequence, multiplied by the complex conjugate of the corresponding subcarrier exponential, e.g. to track the $c_3(t)$ component, the receiver must correlate with $c_3(t) \cdot e^{-j(\omega_s t + \pi/2)}$. The corresponding correlation function $C_{E5bQ}(\tau)$ can easily be derived (assuming an infinite bandwidth):

$$C_{E5bQ}(\tau) = \int_{T_{int}} c_3(t) \cdot e^{j\left(\omega_s t + \frac{\pi}{2}\right)} \cdot c_3(t-\tau) \cdot e^{-j\left(\omega_s(t-\tau) + \frac{\pi}{2}\right)} dt \propto \text{triangle}(\tau) \cdot e^{j\omega_s \tau} \quad (4)$$

where:

the sign "$\propto$" stands for "is proportional to";

$$\text{triangle}(\tau) = \begin{cases} 1 - |\tau| & |\tau| < T_c \\ 0 & \text{otherwise;} \end{cases}$$

$\tau$ is the delay between the incoming signal and the local code and subcarrier replicas;

$T_{int}$ is the integration time; and $T_c$ is the chip length in units of time.

Figure 2:
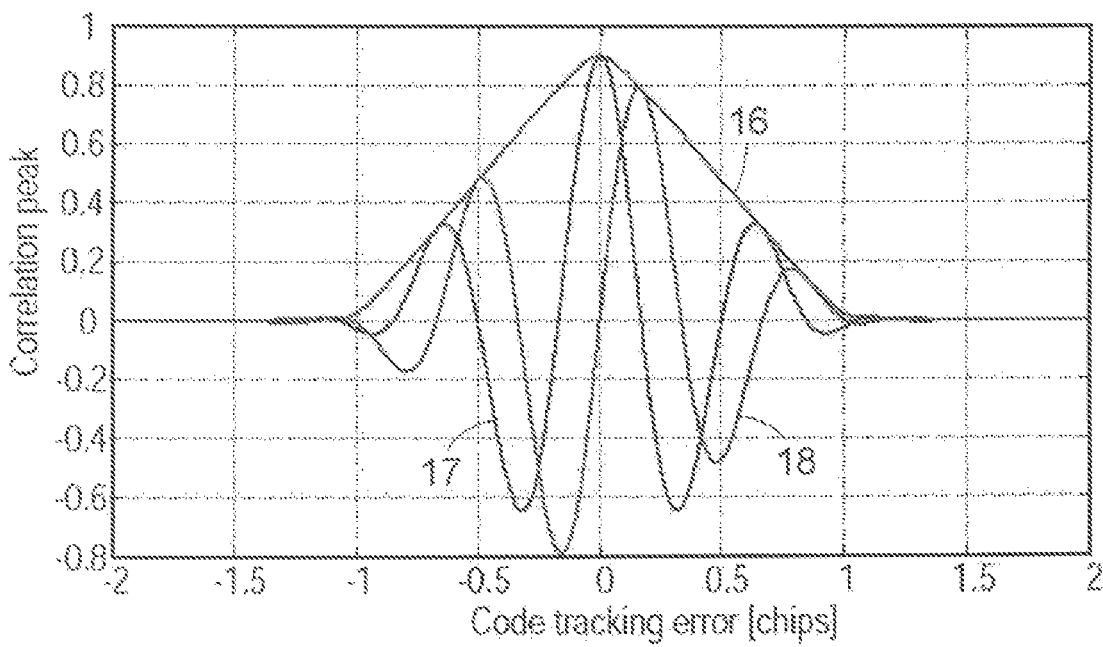
FIG. 2 represents a curve of a single component correlation function for demodulating each component of a AltBOC signal.

The variations of the signal $C_{E5bQ}(\tau)$ as a function of the code tracking error are shown in FIG. 2. Curves 17 and 18 are respectively the real (I) and the imaginary (Q) components of this function, whereas curve 16 is the magnitude thereof. It can be seen that it is a complex function of $\tau$: if the local code and subcarrier replicas are misaligned, energy moves from the I- to the Q-branch. Such a correlation peak cannot be tracked as the code and carrier misalignments are not clearly separated: any code misalignment leads to a carrier phase tracking error. As the carrier loop is generally much faster than the code loop, it will tend to zero the energy in the Q branch, resulting in the code loop seeing a pure BPSK correlation peak.

The additional information needed to make use of the BOC principle is the fact that the other side-band is coherently transmitted at a frequency distance of exactly $2f_s=\omega_s/\pi$. The $C_{E5aQ}(\tau)$ correlation function is given by correlating $s_P(t)$ with $c_4(t) \cdot e^{j(\omega_s t-\pi/2)}$.

$$C_{E5aQ}(\tau) = \int_{T_{int}} c_4(t) \cdot e^{-j(\omega_s t-\pi/2)} \cdot c_4(t-\tau) \cdot e^{j(\omega_s(t-\tau)-\pi/2)} dt \propto \text{triangle}(\tau) \cdot e^{-j\omega_s \tau} \quad (5)$$

Figure 3:
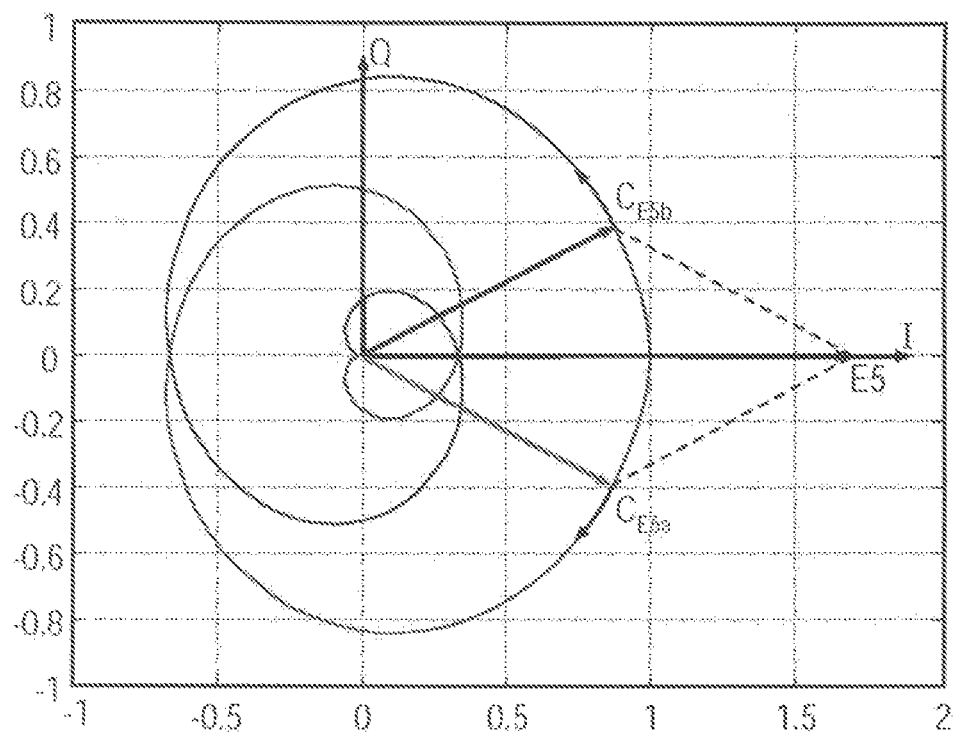
FIG. 3 is a Fresnel diagram of E5aQ and E5bQ single component correlation functions.

A Fresnel diagram as plotted in FIG. 3 provides an intuitive view of the complex $C_{E5aQ}(\tau)$ and $C_{E5bQ}(\tau)$ correlations. In this diagram, both correlations are represented as vectors in the I, Q plane. As the code delay $\tau$ increases, $C_{E5bQ}$ and $C_{E5aQ}$ rotate with an angle $+\omega_s\tau$ and $-\omega_s\tau$ respectively, and their amplitude decreases according to the triangle function, leading to the two helixes as shown in the figure.

A combined correlation peak function can be derived by summing the $C_{E5aQ}$ and $C_{E5bQ}$ correlations, which corresponds to summing the vectors in FIG. 3:

$$C_{E5Q}(\tau) = C_{E5bQ}(\tau) + C_{E5aQ}(\tau) \quad (6)$$
$$= \text{triangle}(\tau) \cdot \cos(\omega_s \tau)$$

Figure 4:
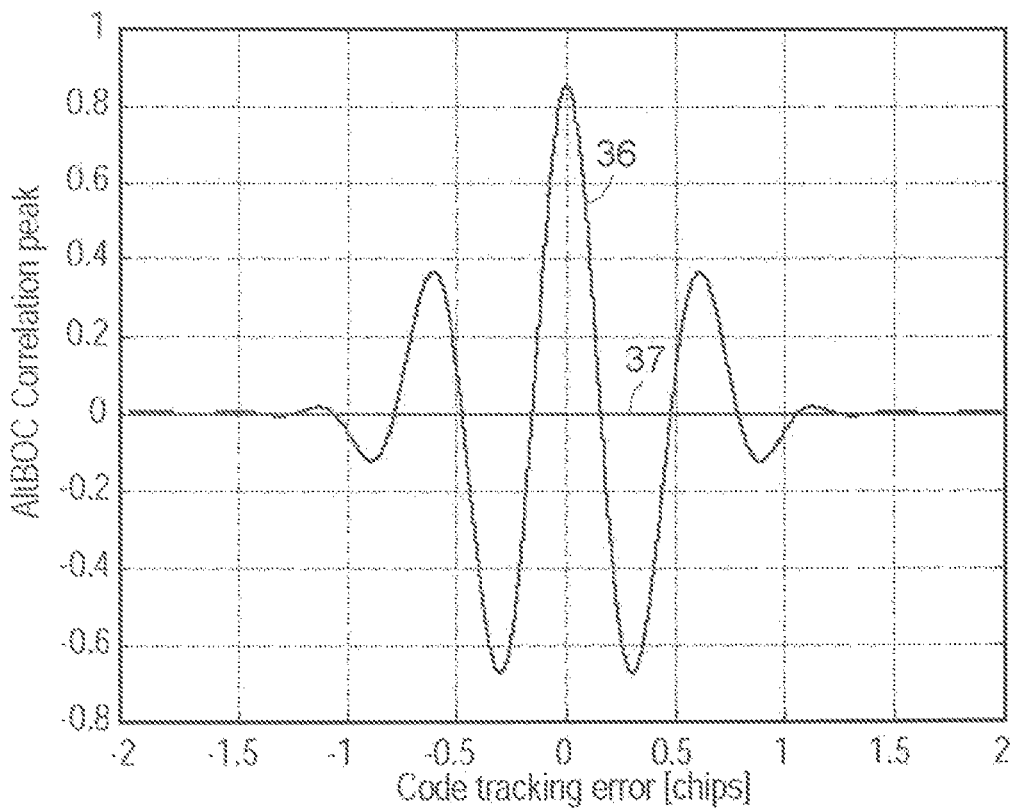
FIG. 4 represents a curve of a combined correlation peak function combining E5aQ and E5bQ single component correlation functions.

As represented in FIG. 4, the function $C_{E5Q}(\tau)$ which corresponds to the AltBOC correlation peak function is real (curve 36) for all code delays, the imaginary part (curve 37) being null, and hence can be used for code tracking.

For the Pilot channel, the combined E5a/E5b correlation peak is simply the sum of the individual E5a and E5b peaks. For the data channel, the same principle can be used, but the data bits have to be wiped off prior to the combination: the E5-Data correlation peak is given by:

$$C_{E5I}(\tau) = d_1 C_{E5bI}(\tau) + d_2 C_{E5aI}(\tau) \quad (7)$$
$$= \text{triangle}(\tau) \cdot \cos(\omega_s \tau)$$

This bit estimation process makes the tracking channel less robust, especially at low signal to noise ratio ($C/N_0$) where the probability of bit error is high.

From this principle, five preferred embodiments of a AltBOC demodulator will be derived according to the invention. With a clever partitioning between pre- and post-correlation processing, the base-band processing of AltBOC can be done with little overhead with respect to traditional BPSK signals.

The AltBOC demodulators presented below are derived assuming the Pilot channel is tracked, but the extension to the Data channel tracking is straightforward.

It has been shown that building the AltBOC correlation peak involves correlating the incoming signal with $c_3(t) \cdot e^{-j(\omega_s t+\pi/2)}$ and $c_4(t) \cdot e^{j(\omega_s t-\pi/2)}$, and summing these two complex correlations. In the receiver, this is done in two identical channels, sharing the same local code and carrier oscillators.

As explained above, demodulation of the $C_3$ component involves correlating the incoming signal with $c_3(t) \cdot e^{-j(\omega_s t+\pi/2)}$. This operation is equivalent to rotating the incoming signal by an angle $-\omega_s t-\pi/2$, followed by multiplying by the $c_3$ PRN chips and integration. The multiplication by the code chips can be seen as an additional rotation by 0° if the chip is +1, or by 180° if the chip is −1. This observation leads to the first AltBOC demodulator channel architecture as represented in FIG. 5.

Figure 5:
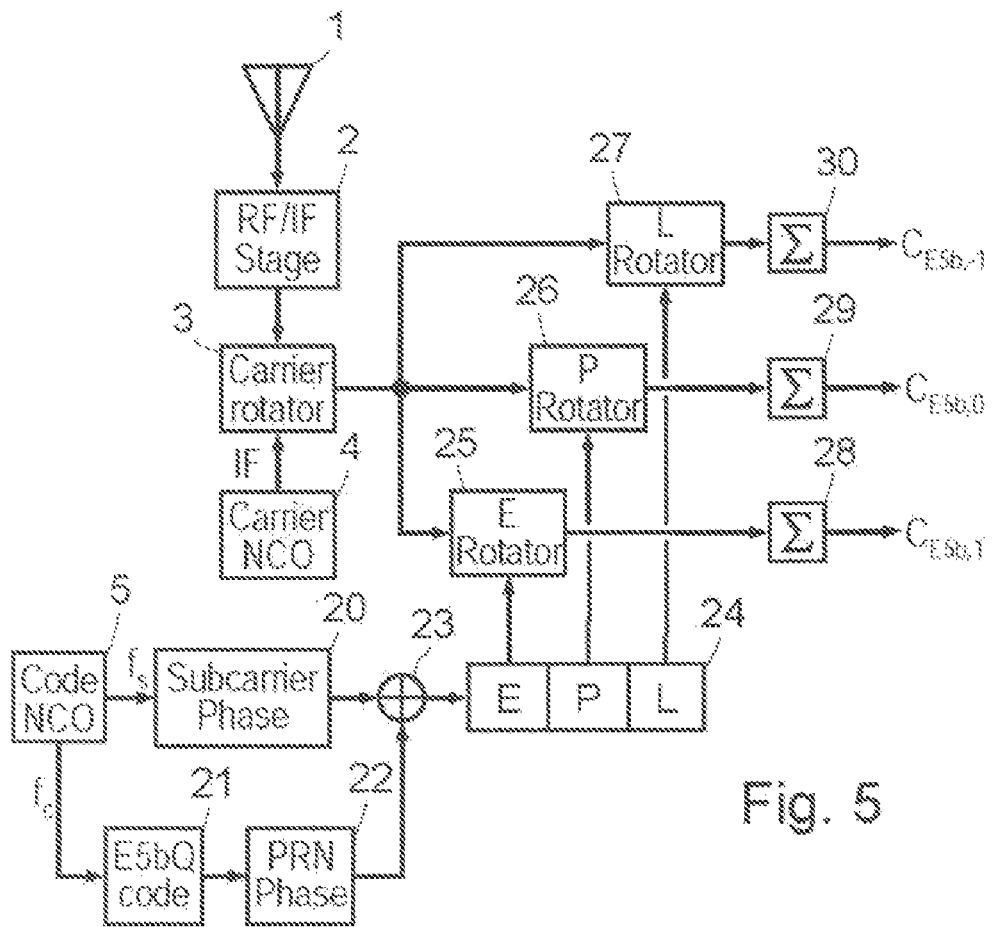
FIG. 5 is a functional block diagram of a AltBOC demodulator channel according to a first embodiment of the present invention.

In FIG. 5, the AltBOC demodulator channel receives over an antenna 1 a signal that includes the AltBOC composite codes transmitted by all of the satellites that are in view. The received signal is applied to a RF/IF stage 2 that converts the received signal RF to an intermediate frequency IF signal having a frequency which is compatible with the other components of the receiver, filters the IF signal through a IF band-pass filter that has a band-pass at the desired center carrier frequency, and samples the filtered IF signal at a rate that satisfies the Nyquist theorem so as to produce corresponding digital in-phase (I) and quadrature (Q) signal samples on N bits in a known manner. The bandwidth of the filter is sufficiently wide to allow the primary harmonic of the AltBOC composite pilot code to pass, or approximately 51 MHz. The wide bandwidth results in relatively sharp code chip transitions in the received code, and thus, fairly well defined correlation peaks.

The AltBOC demodulator comprises a local oscillator 4, for example of the NCO type (Numerically Controlled Oscillator), synchronized with the frequency IF to generate a phase rotation angle on M bits which is applied to a phase rotator 3 receiving the IF signal samples on N bits. The phase-rotated signal samples delivered by the phase rotator 3 are applied in parallel to three phase rotators 25, 26, 27 before being integrated in three respective integrators 28, 29, 30 which sum their input signal samples during the integration time $T_{int}$.

The AltBOC demodulator further comprises another local oscillator 5 of the NCO type synchronized with the code chipping rate $f_c$ and generating the code chipping rate and the subcarrier frequency $f_s=1.5 f_c$, for driving a subcarrier phase generator 20 and a E5b code generator 21. The output of E5b code generator 21 is connected to a PRN phase detector 22. The subcarrier phase generator 20 generates the phase of the subcarrier on M bits at the rate $f_s$ provided by the code NCO oscillator 5. The E5bQ code generator 21 generates the E5bQ code chips (0 or 1) at the rate $f_c$ given by the code NCO oscillator 5. The PRN phase detector translates the code chips (0 or 1) into a phase rotation angle 0 or $\pi$.

The respective output signals of the subcarrier phase generator and PRN phase detector are added by an adder 23, the output signal of the adder being a phase shift signal (real number coded on M bits) controlling a multi-bit delay line 24 with three cells E, P, L producing respectively early, prompt and late replicas of received PRN codes which are applied as phase shifts respectively to the phase rotators 25, 26, 27.

The correlation signals $C_{E5b,-1}$, $C_{E5b,0}$ and $C_{E5b,1}$ delivered by the integrators 28, 29, 30 are then used as input of discriminators that sense code and carrier phase misalignments which are used to control the NCO oscillators 4, 5.

Figure 1:
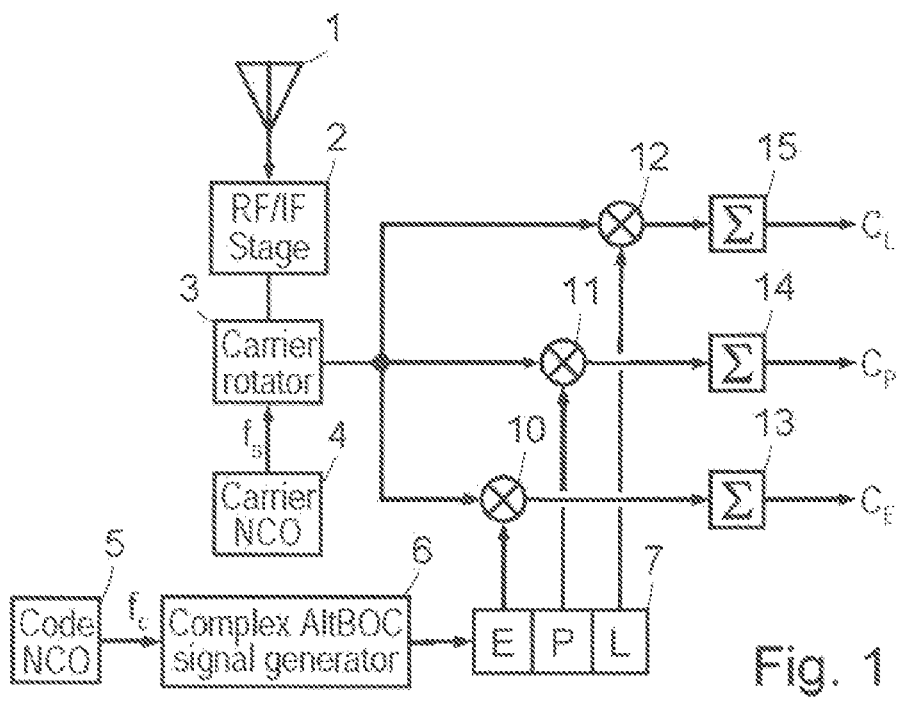
FIG. 1 is a functional block diagram of a AltBOC demodulator channel according to prior art.

The demodulator channel of FIG. 5 presents two main differences with respect to a traditional AltBOC demodulation channel as shown in FIG. 1:

the input to the delay-line 7 is a phase shift in the form of a real-valued signal;

the multiplication with the chip prior to the integration is replaced by a phase rotation.

While the gate count required for this architecture is smaller than that of the standard architecture in FIG. 1, it is still large compared to the traditional 1-bit wide delay line.

The architecture described in reference to FIG. 5 can be largely improved by noting that the E, P and L rotators 25, 26, 27 all rotate at the same frequency, but with a fixed phase difference. Namely, if the P rotator 26 applies a phase shift of $-\omega_s t-\pi/2$, the E rotator 25 applies a phase shift of $-\omega_s(t+dT_c/2)-\pi/2$ and the L rotator 27 of $-\omega_s(t-dT_c/2)-\pi/2$, where d is the Early-Late spacing in units of chips, and $T_c$ is the chip duration. This constant phase difference of $\pm\omega_s dT_c/2$ can be taken out of the integration, and performed at low speed in post-correlation (after integration).

Figure 6:
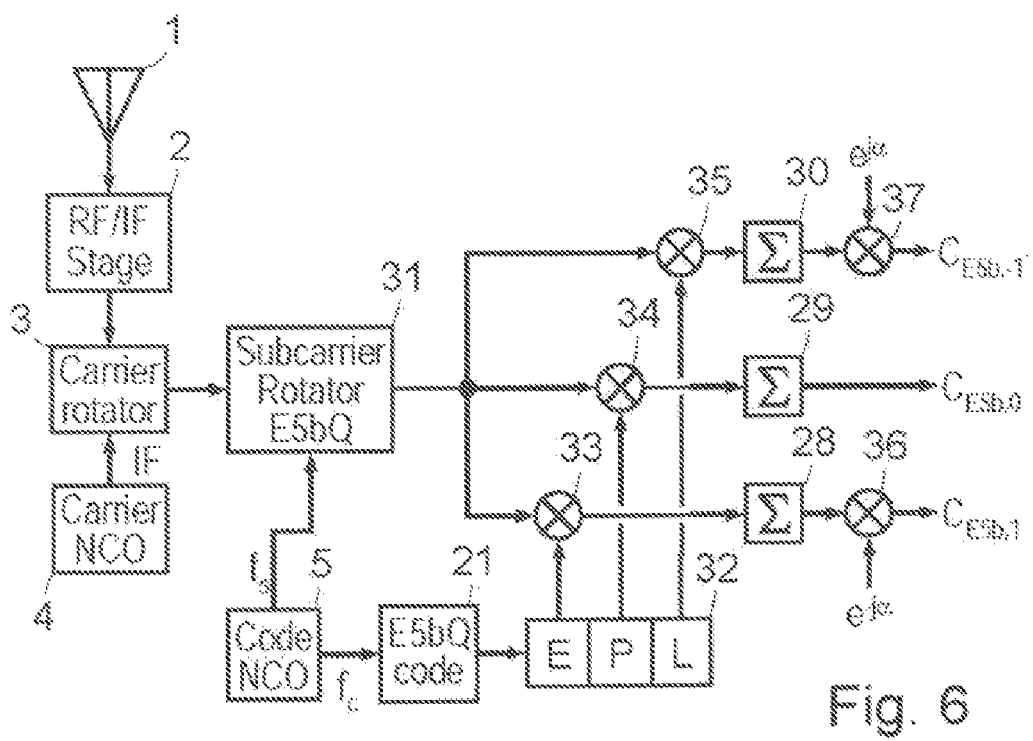
FIG. 6 is a functional block diagram of a AltBOC demodulator channel according to a second embodiment of the present invention.

This leads to the optimized architecture as presented in FIG. 6. Compared to the architecture of FIG. 5:

- each of the three rotators 25, 26, 27 is replaced by a respective signal multiplier 33, 34, 35,
- a subcarrier rotator E5bQ 31 is inserted between the output of the carrier rotator 3 and the respective inputs of the signal multipliers 33, 34, 35, and performs a phase rotation by $e^{-j(\omega_s t+\pi/2)}$,
- the multi-bit delay-line 24 is replaced by a one-bit wide code delay line 32 (the PRN phase detector being removed) and controlled directly by the E5b code generator 21, and two signal multipliers 36, 37 respectively by $e^{-j\alpha}$ et $e^{j\alpha}$ are inserted respectively at the output of the E and L integrators 28 and 30.

The two signal multipliers 36, 37 belong to a low-speed post-correlation stage (after integration), whereas the other part of this architecture belongs to a high-speed pre-correlation stage.

With this architecture, the only additional block with respect to a traditional BPSK demodulator is the subcarrier rotator 31, the phase of which is controlled by the code NCO oscillator 5. This architecture is mathematically equivalent to architecture of FIG. 5 if $\alpha$ is set to $\omega_s dT_c/2$. However, other values of $\alpha$ can be chosen to obtain virtually any other phase shift between the early and late replicas.

For clarity, the AltBOC demodulator architectures described in reference with FIGS. 5 and 6 only show three complex correlators (early, punctual and late). In reality, detection of side-lobe tracking may require at least two additional correlators (very-early and very-late), but this is a straightforward extension of the structure.

Thus the architecture represented in FIG. 5 or 6 can be extended to any number of correlators. For instance, n early and m late correlators can be used, each being feed with a respective cell of a delay line. $C_{E5b,0}$ corresponds to the prompt correlation. Typically, the early and late correlations are computed with a delay of one cell with respect to the prompt correlation, i.e., they correspond to $C_{E5b,1}$ and $C_{E5b,-1}$ respectively. However, they can be set to any other delay. A typical application of the additional correlations is the detection of side peak tracking.

FIGS. 5 and 6 illustrate the architecture of one individual channel. In the AltBOC receiver, two of these channels for the E5 signal (one for E5a and one for E5b) are put together and the correlations are summed to produce an AltBOC correlation signal. Such a combined channel derived from the architecture of FIG. 6 is represented in FIG. 7.

Figure 7:
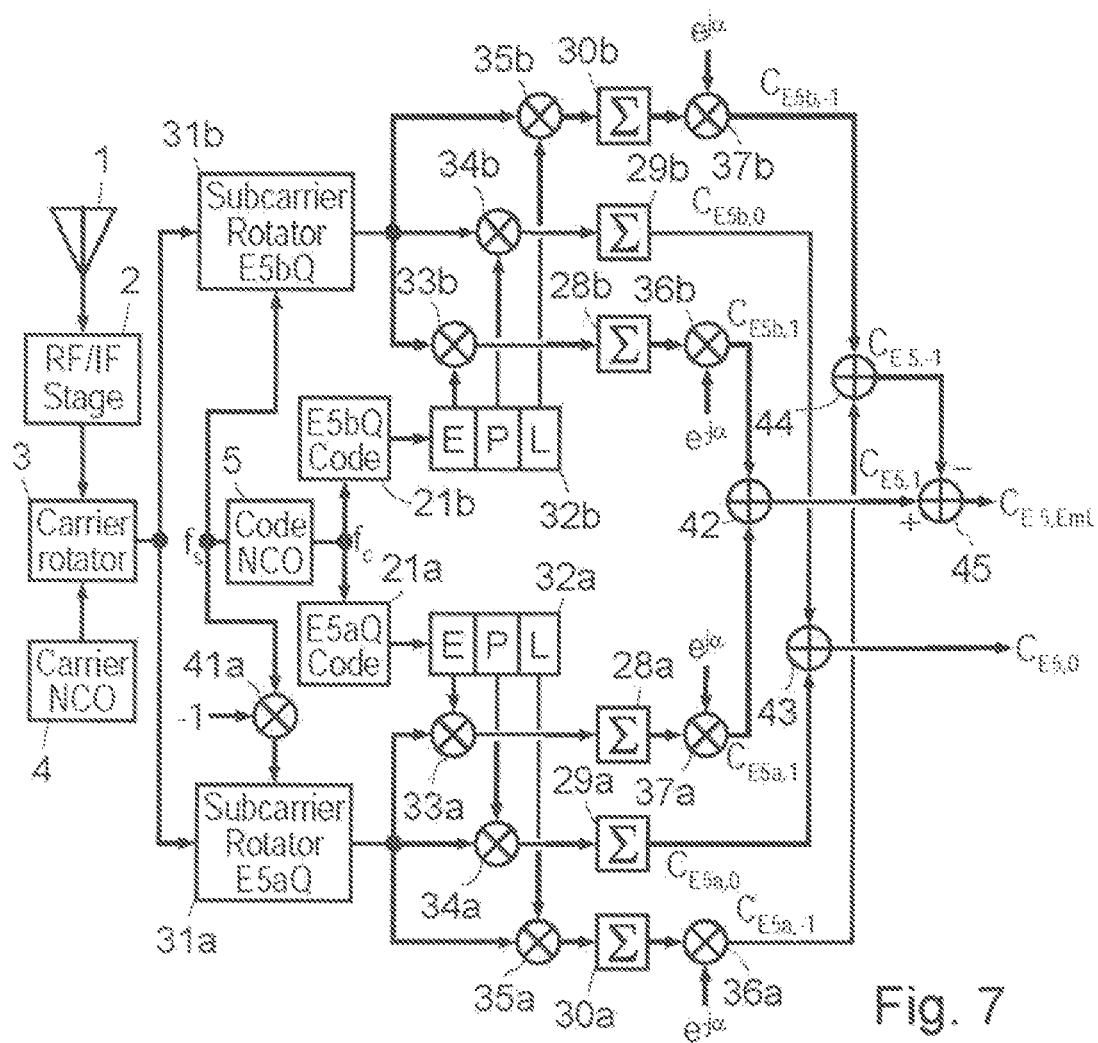
FIG. 7 is a functional block diagram of a AltBOC demodulator with two channels as shown in FIG. 6.

In FIG. 7, the architecture comprise a common RF/IF stage 2, carrier rotator 3, carrier NCO 4 and code NCO 5.

Each channel E5a, E5b comprises a subcarrier phase rotator 31a, 31b, a E5a/E5b code generator 21a, 21b feeding a respective delay line 32a, 32b, three respective correlators E, P, L, each including a signal multiplier 33a, 34a, 35a, 33b, 34b, 35b and an integrator 28a, 29a, 30a, 28b, 29b, 30b. The early and late branches of each channel E5a, E5b further comprise two respective signal multipliers 36a, 37a, 36b, 37b by a factor respectively equal to $e^{-j\alpha}$ and $e^{j\alpha}$. The subcarrier phase rotator 31b performs a phase rotation by $e^{-j(\omega_s t+\pi/2)}$, whereas the subcarrier phase rotator 31a performs a phase rotation by $e^{j(\omega_s t+\pi/2)}$.

Channel E5a further comprises an additional signal multiplier 41a by a factor equal to −1, inserted between the code NCO 5 and the subcarrier rotator E5aQ 31a. The outputs of the two channels are added by three adders 42, 43, 44 outputting respectively correlation signals $C_{E5,1}$, $C_{E5,0}$ and $C_{E5,-1}$.

Extending formulas (4) and (5), it can be derived that the $C_{E5b,k}$ and $C_{E5a,k}$ correlations are given by the following:

$$C_{E5b,1} = \text{triangle}\left(\frac{d}{2}-\tau\right)e^{j(\omega_s\tau-\alpha)} = \left(1-\frac{d}{2}+\tau\right)e^{j(\omega_s\tau-\alpha)} \quad (8)$$

$$C_{E5b,0} = \text{triangle}(\tau)e^{j(\omega_s\tau)} = (1-\tau)e^{j(\omega_s\tau)} \quad (9)$$

$$C_{E5b,-1} = \text{triangle}\left(\frac{d}{2}+\tau\right)e^{j(\omega_s\tau+\alpha)} = \left(1-\frac{d}{2}-\tau\right)e^{j(\omega_s\tau+\alpha)} \quad (10)$$

$$C_{E5a,1} = \text{triangle}\left(\frac{d}{2}-\tau\right)e^{-j(\omega_s\tau-\alpha)} = \left(1-\frac{d}{2}+\tau\right)e^{-j(\omega_s\tau-\alpha)} \quad (11)$$

$$C_{E5a,0} = \text{triangle}(\tau)e^{-j(\omega_s\tau)} = (1-\tau)e^{-j(\omega_s\tau)} \quad (12)$$

$$C_{E5a,-1} = \text{triangle}\left(\frac{d}{2}+\tau\right)e^{-j(\omega_s\tau+\alpha)} = \left(1-\frac{d}{2}-\tau\right)e^{-j(\omega_s\tau+\alpha)} \quad (13)$$

where $\alpha=\omega_s dT_c/2=2\pi f_s dT_c/2$. The Early-Late spacing d is determined by the clocking frequency of the delay line 32. Typically, d ranges from 0.1 to 1.

For tracking, the receiver uses the $C_{E5,k}$ correlations to build code and carrier phase discriminators of which the output is proportional to the code and carrier phase tracking error respectively.

The basis quantity used in the PLL discriminator is the punctual correlation $C_{E5,0}$. The basic quantity used in the DLL discriminator is the difference between the Early and the Late correlations, also referred to as the Early-minus-Late correlation, and noted $C_{E5,EmL}$. This difference reads:

$$C_{E5,EmL}=C_{E5,1}-C_{E5,-1}=C_{E5b,1}+C_{E5a,1}-C_{E5b,-1}-C_{E5a,-1} \quad (14)$$

In the special case of $d=1/(2f_s T_c)=1/(2*15.345/10.23)=1/3$, $\alpha$ equals $\pi/2$, and it can be shown that $C_{E5,EmL}$ is proportional to $j(C_{E5a,0}-C_{E5b,0})$ for small tracking errors $\tau$. This fact leads to a dramatic reduction of the channel complexity, as only the punctual correlations ($C_{E5a,0}$ and $C_{E5b,0}$) need to be computed for both the code and carrier tracking.

This property can be demonstrated by reworking the expression for $C_{E5,EmL}$ as follows, taking into account that $\alpha=\pi/2$. Inserting formulas (8) to (13) into formula (14) leads to:

$$C_{E5,EmL}(\tau) = \left(1-\frac{d}{2}+\tau\right)[e^{j(\omega_s\tau-\pi/2)}+e^{-j(\omega_s\tau-\pi/2)}] + \quad (15)$$
$$\left(1-\frac{d}{2}-\tau\right)[e^{j(\omega_s\tau-\pi/2)}+e^{-j(\omega_s\tau-\pi/2)}]$$
$$= (2-d)[e^{j(\omega_s\tau-\pi/2)}+e^{-j(\omega_s\tau-\pi/2)}] \quad (16)$$
$$= 2(2-d)\sin(\omega_s\tau) \quad (17)$$

On the other hand, for small code tracking errors ($\tau \ll 1$), $j(C_{E5a,0}-C_{E5b,0})$ is simply:

$$j(C_{E5a,0}-C_{E5b,0})=j(1-\tau)[e^{-j\omega_S\tau}-e^{j\omega_S\tau}]=2\sin(\omega_S\tau) \quad (18)$$

This relation demonstrates that $C_{E5,EmL}$ is proportional to $j(C_{E5a,0}-C_{E5b,0})$. The factor (2-d) is irrelevant as it is purely an amplification factor compensated for in the discriminator normalization.

Figure 8:
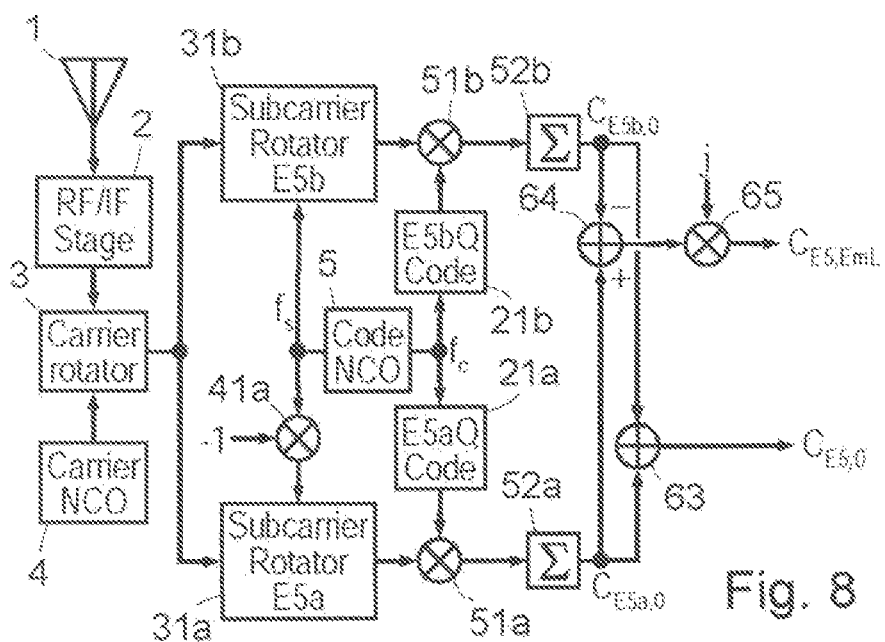
FIG. 8 is a functional block diagram of two channels of a AltBOC demodulator according to a third embodiment of the present invention.

This lead to an architecture as represented in FIG. 8, which is equivalent to the architecture of FIG. 7 in the case of d=1/3, though much simpler.

With respect to the architectures of FIGS. 6 and 7, this architecture does not comprises code delay lines 32a, 32b and have a single correlator for each E5a and E5b codes. Each correlator comprises a single signal multiplier 51a, 51b receiving the output of the corresponding subcarrier rotator E5a and E5b 31a, 31b and the codes from the corresponding E5a and E5b code generator 21a, 21b and a single integrator 52a, 52b. The output signals $C_{E5a,0}$ and $C_{E5b,0}$ of the integrators 52a, 52b are applied to an adder 63 so as to obtain the punctual correlation signal $C_{E5,0}$, and to a comparator 64 and a multiplier by j 65 so as to obtain the Early-minus-Late correlation signal $C_{E5,EmL}=j(C_{E5a,0}-C_{E5b,0})$.

It can be seen that this last architecture is extremely simple, as there is only one correlator needed per channel. Surprisingly, this leads to the conclusion that the AltBOC demodulator can be implemented very efficiently in terms of gate count, despites its apparent complexity.

Figure 9:
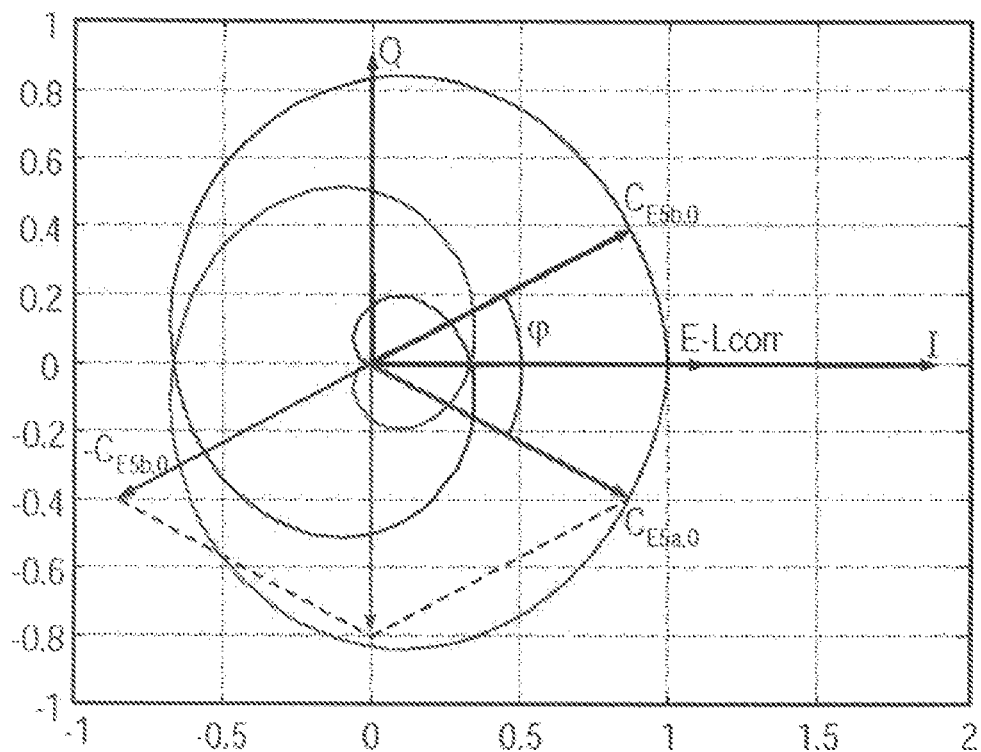
FIG. 9 is a Fresnel diagram of E5aQ and E5bQ single component correlation functions obtained with the AltBOC demodulator of FIG. 9.

This last architecture shows that the tracking of the AltBOC signal can be done without any Early or Late correlator. This surprising result can be intuitively understood by drawing another Fresnel diagram, as in FIG. 9. As established above, the code misalignment $\tau$ is proportional to the angle $\phi$ between the $C_{E5a,0}$ and the $C_{E5b,0}$ correlation vectors: $\phi=2\omega_S\tau$. It is also visible on the diagram that the vector $j(C_{E5a,0}-C_{E5b,0})$, noted "E-L corr" in the diagram, obtained by subtracting the $C_{E5b,0}$ vector from the $C_{E5a,0}$ vector, and by rotating the resulting vector by 90 degrees, is real, and has an amplitude proportional to the angle $\phi$. This is the fundamental reason why the AltBOC code tracking does not need Early and Late code replicas: the code misalignment can be derived solely from the punctual correlators.

Figure 10:
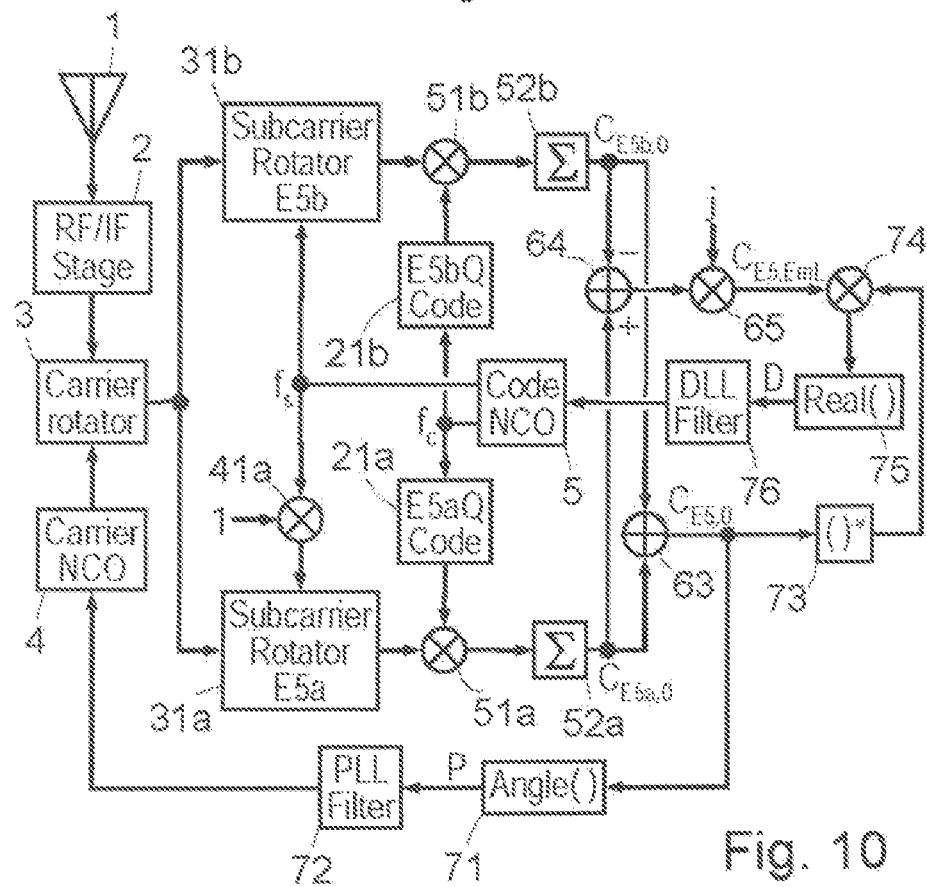
FIG. 10 is a functional block diagram of a first embodiment of a receiver comprising the AltBOC demodulator of FIG. 8.

FIG. 10 represents a receiver comprising the AltBOC demodulator of FIG. 8, and PLL (Phase-Lock Loop) and DLL (Delay-Lock Loop) controlling respectively the carrier NCO 4 and the Code NCO 5.

The PLL comprises a discriminator 71 the output P of which is filtered by a PLL filter 72 before being applied to a control input of the carrier NCO 4. The PLL discriminator 71 is the arctan discriminator, which consists in computing the angle of the complex number $C_{E5,0}$:

$$P=\text{Angle}(C_{E5,0}). \quad (19)$$

The DLL comprises a DLL discriminator receiving the correlation signal $C_{E5,EmL}$ and a DLL filter 76 connected to a control input of the code NCO 5.

The DLL discriminator is of the type Dot-product power discriminator, which compute the signal D=Real $(C_{E5,EmL}\cdot C^*_{E5,0})$. Thus the DLL discriminator comprises a complex conjugate function 73 to which the signal $C_{E5,0}$ is applied and a signal multiplier 74 for multiplying the signals provided by the multiplier by j 65 and the complex conjugate function 73. The signal D is then obtained by a function 75 extracting the real part of the complex signal delivered by the signal multiplier 74.

Figure 11:
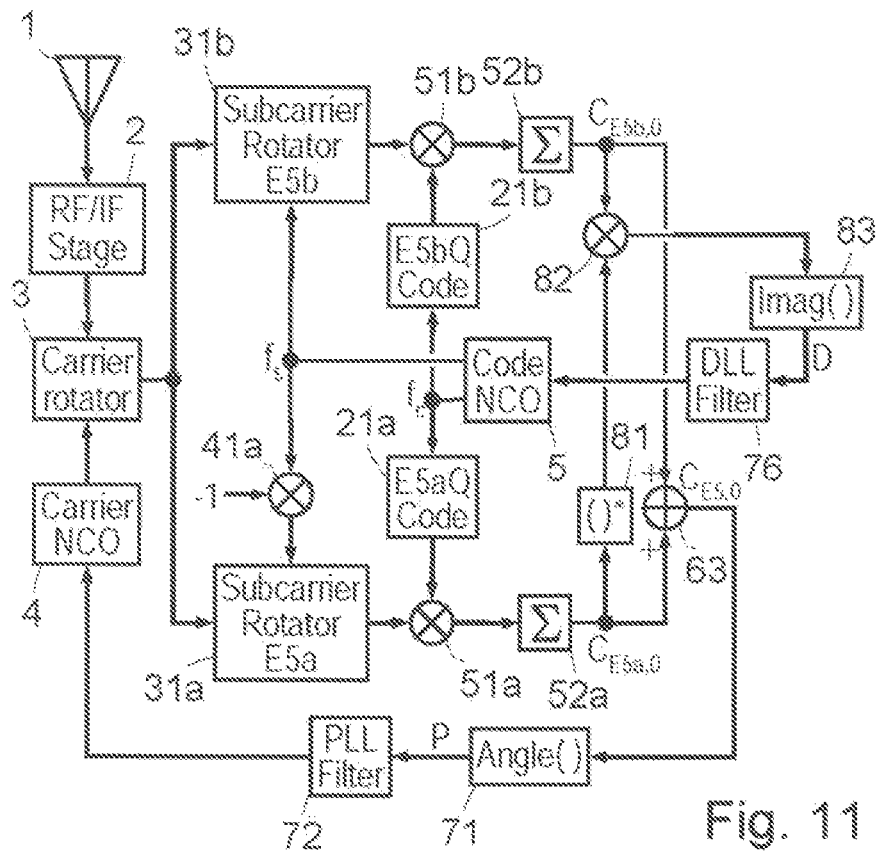
FIG. 11 is a functional block diagram of a second embodiment of a receiver comprising the AltBOC demodulator of FIG. 8.

After some algebraic manipulations, a simplified architecture as represented in FIG. 11 can be derived from the architecture of FIG. 10, which requires fewer operations to compute the same DLL discriminator.

According to the discriminator of FIG. 10:

$$D=\text{Real}[C_{E5,EmL}\cdot C^*_{E5,0}]=\text{Real}[j(C_{E5a,0}-C_{E5b,0})\\(C_{E5a,0}+C_{E5b,0})^*]=\text{Real}[-j(|C_{E5b,0}|^2-|C_{E5a,0}|^2+2j\\\text{Imag}(C_{E5b,0}C^*_{E5a,0}))]=2\,\text{Imag}(C_{E5b,0}C^*_{E5a,0}) \quad (20)$$

Thus, in FIG. 11, the DLL discriminator comprises a complex conjugate function 81 to which the correlation signal $C_{E5a,0}$ is applied and a signal multiplier 82 for multiplying the signal provided by complex conjugate function and the correlation signal $C_{E5b,0}$. The signal D is then obtained by a function Imag() 83 extracting the imaginary part of the complex signal delivered by the signal multiplier 82.

A further modification of the architecture of FIG. 11 would be the replacement of the Imag() operator by an Angle() operator (i.e. a block providing the same functionality as the arctan discriminator 71).

Figure 12:
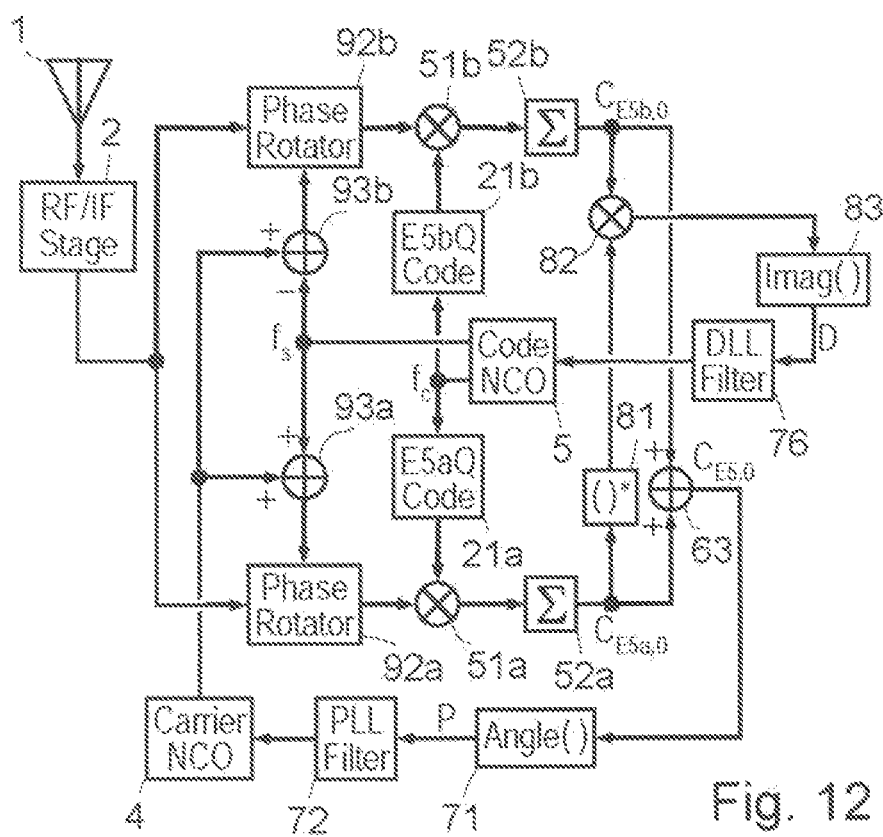
FIGS. 12 and 13 are functional block diagrams of a third and fourth embodiments of a AltBOC receiver derived from the receiver of 11.

The architecture of FIG. 11 can be further optimized as shown in FIG. 12 by noticing that the phase rotation in the carrier rotator 3 followed by the phase rotation in the subcarriers rotators 31a, 31b can be combined in one single phase rotation by a phase corresponding to the sum of the carrier and subcarrier phases.

Thus in FIG. 12, the carrier rotator 3, the two subcarrier rotators 31a, 31b and the multiplier 41a of FIG. 11 are replaced with two phase rotators 92a and 92b (one for each channel E5a and E5b) receiving the down-converted signal from the RF/IF stage 2. Besides, the subcarrier phase provided by the code NCO 4 is added by an adder 93a to the phase provided by the carrier NCO 3 and subtracted therefrom by an adder 93b, the addition results being respectively applied to the phase rotators 92a, 92b of channels E5a, E5b.

Figure 13:
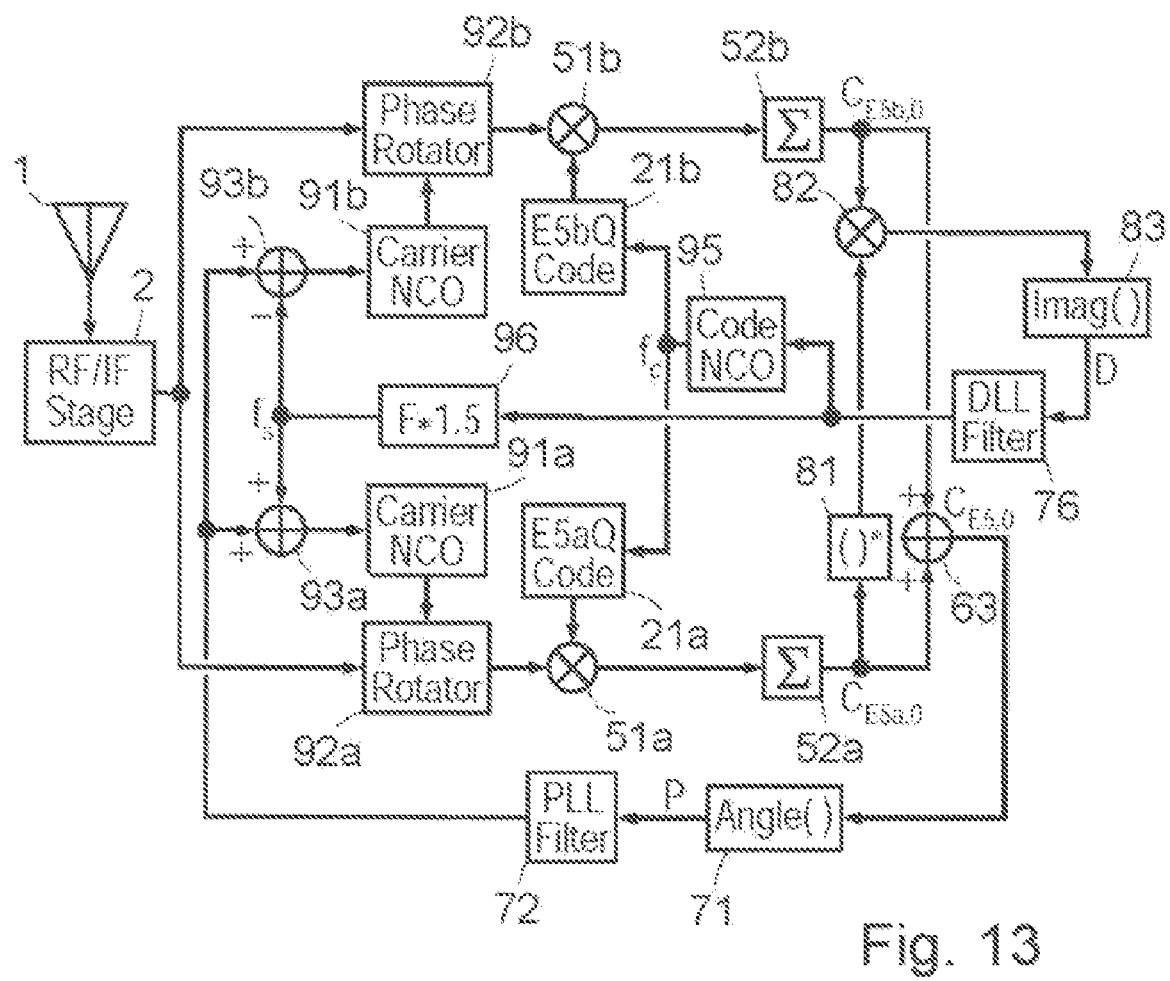

The architecture as shown in FIG. 13 can be derived from the previous architecture by replacing the Code NCO by a more simple NCO 95 delivering only the code chipping rate f, and a frequency multiplier 96 by 1.5 applied to the code chipping rate $f_c$ so as to obtain the subcarrier frequency $f_s$ which is applied as input to the adders 93a, 93b. This requires to duplicate the carrier NCO 4, one for each channel E5a, E5b. The carrier frequency tracked by the PLL is applied to the adders 93a, 93b the respective outputs of which drive the carrier NCOs 91a, 91b of the two channels E5a, E5b, so as to follow the respective combined carrier+subcarrier frequencies of the two channels E5a, E5b.

In this architecture the high-speed pre-correlation stages of E5a and E5b channels remain identical. They both comprise a phase rotator 92a, 92b, two NCOs 91a, 91b, a code generator 21a, 21b and a correlator. Moreover, if the code NCO is duplicated so as to have one NCO per channel, each of the high-speed pre-correlation stages of E5a and E5b channels is identical to a traditional BPSK (Binary Phase-Shift Keying) channel, which offers great benefits in the design of a combined AltBOC/BPSK receiver.

Of course, the optimizations performed in the architectures of FIGS. 12 and 13 can be as well applied to the architectures of FIG. 5, 6 or 7.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for demodulating alternate binary offset carrier signals comprising at least two subcarriers each having an in-phase and a quadrature component modulated by pseudo-random codes, the quadrature components being modulated by dataless pilot signals, the in-phase components being modulated by data signals, the method comprising:
converting the alternate binary offset carrier signals into an intermediate frequency, band-pass filtering the converted signals and sampling the filtered signals;
generating a carrier phase and carrier phase-rotating the sampled signals by the carrier phase;
correlating the rotated sampled signals; and
generating, for each subcarrier, pseudo-random binary codes and a subcarrier phase, which are used to correlate the rotated sampled signals.

2. The method according to claim 1, further comprising:
translating the pseudo-random codes of the subcarriers into phase angles which are combined respectively with the subcarrier phases so as to obtain resultant phase angles for each subcarrier, the resultant phase angles being phase-shifted so as to obtain at least one early, a prompt and at least one late phase angles for each subcarrier,
the correlation including phase-rotating the rotated sampled signals by the early, prompt and late phase angles of each subcarrier, for obtaining early, prompt and late replicas of the sampled signals for each subcarrier, and integrating respectively the early, prompt and late replicas for each subcarrier during a predefined time.

3. The method according to claim 1, further comprising:
phase-rotating the rotated sampled signals by the subcarriers phases so as to obtain phase-rotated sampled signals for each subcarrier, before correlating the rotated sampled signals.

4. The method according to claim 3, further comprising:
bit-shifting the pseudo-random codes so as to obtain at least one early, a prompt and at least one late pseudo-random codes,
the correlation including combining the phase-rotated sampled signals for each subcarrier with the early, prompt and late pseudo-random codes, and integrating the resulting signals during a predefined time, so as to obtain early, prompt and late correlation signals for each sub carrier;
a low speed post-correlation phase including phase-rotating the early and late correlation signals of each subcarrier respectively by opposite constant phase angles ($j\alpha, -j\alpha$), and adding respectively the thus obtained early correlation signals of the subcarriers, the prompt correlation signals of the subcarriers and the thus obtained late correlation signals of the subcarriers so as to obtain respectively resultant early, prompt and late correlation signals.

5. The method according to claim 3, further comprising:
determining a combined carrier and subcarrier frequency for each subcarrier, the steps of phase-rotating by the carrier phase and the sub carriers phases being combined into a single phase rotation step for each subcarrier using the combined carrier and subcarrier frequencies.

6. The method according to claim 3, wherein the correlation includes combining the phase-rotated sampled signals for each subcarrier respectively with the pseudo-random codes of the subcarrier, and integrating during a predefined time the resulting signals for obtaining a correlation signal for each subcarrier.

7. The method according to claim 6, further comprising:
a low speed post-correlation phase including combining the correlation signals for the subcarriers so as to obtain a prompt correlation signal used as an input of a PLL discrimination driving an oscillator controlling the carrier rotation step and a early-minus-late correlation signal used as an input of a DLL discrimination driving an oscillator controlling the code generation and the subcarrier phase generation.

8. The method according to claim 7, wherein the early-minus-late correlation signal is obtained from the correlation signals for the subcarriers by the following formula:

$$C_{E5,EmL} = J(C_{E5a,0} - C_{E5b,0}).$$

9. The method according to claim 7, wherein the DLL discrimination is of the type Dot-product power discrimination and performs the following operation:

$$D = \text{Real}[C_{E5,EmL} \cdot C^*_{E5,0}],$$

where Real( ) is a function returning the real part of a complex number,
the signal D being used to drive the oscillator (5) controlling the code generation and the subcarrier phase generation.

10. The method according to claim 7, wherein the DLL discrimination performs the following operation:

$$D = \text{Imag}(C_{E5b,0} \cdot C^*_{E5a,0}),$$

where Imag( ) is a function returning the imaginary part of a complex number.

11. A device for demodulating alternate binary offset carrier signals comprising at least two subcarriers, each having an in-phase and a quadrature component modulated by pseudo-random codes, the quadrature components being modulated by dataless pilot signals, the in-phase components being modulated by data signals, the device comprising:
means for converting the alternate binary offset carrier signals into an intermediate frequency, band-pass filtering the converted signals and sampling the filtered signals;
means for generating a carrier phase and carrier phase-rotating the sampled signals by the carrier phase;
means for correlating the rotated sampled signals; and
means for generating, for each subcarrier, pseudo-random binary codes and a subcarrier phase, which are used to correlate the rotated sampled signals.

* * * * *